G. H. CHAPLAIN.
STEERING GEAR.
APPLICATION FILED AUG. 4, 1916.
1,233,025.
Patented July 10, 1917.
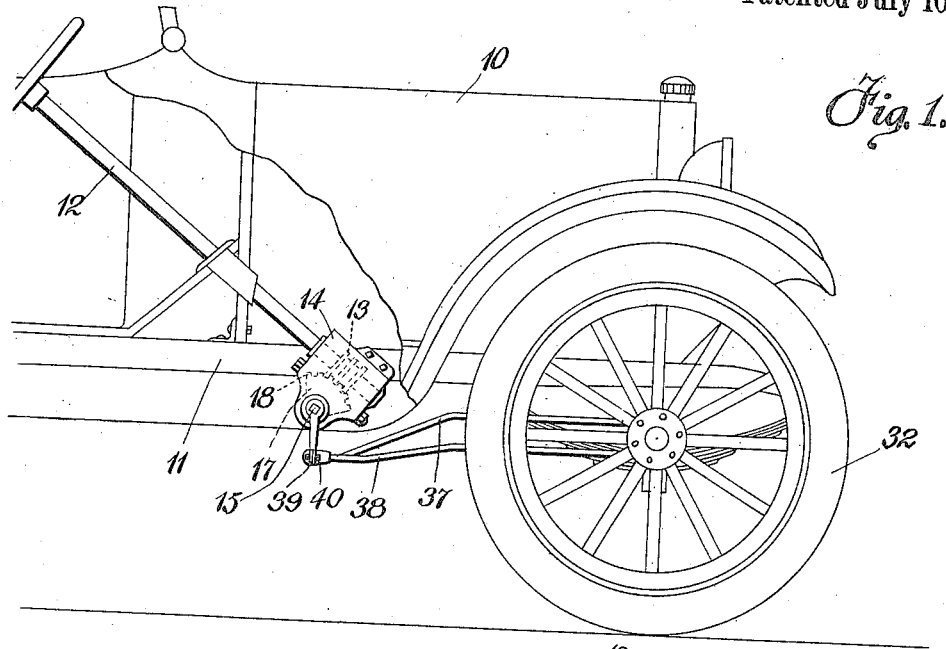
Fig. 1.
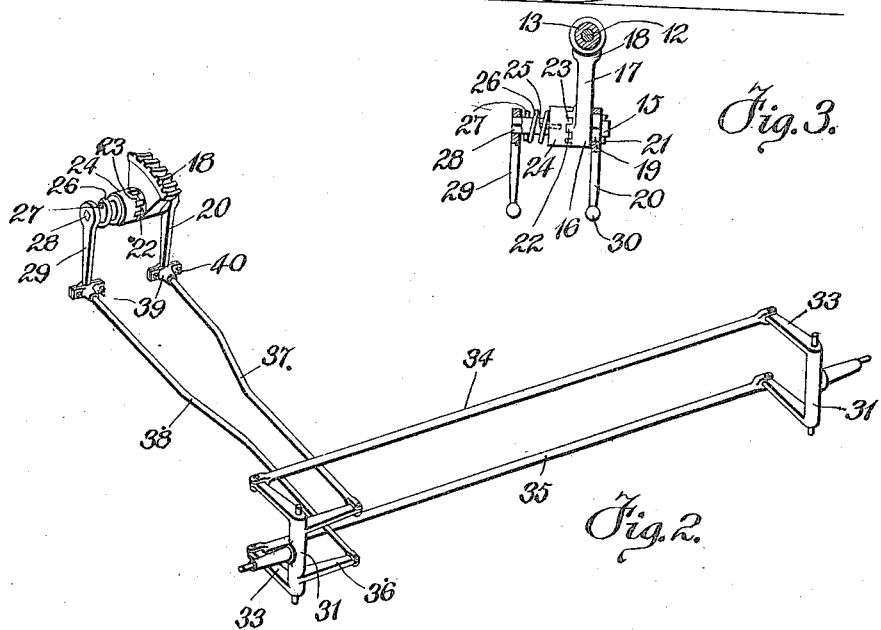
Fig. 3.
Fig. 2.
Inventor
G. H. Chaplain,
By
Attorneys

UNITED STATES PATENT OFFICE.

GEORGE H. CHAPLAIN, OF LEAVENWORTH, KANSAS, ASSIGNOR OF ONE-HALF TO JOHN M. TOPPER, OF LEAVENWORTH, KANSAS.

STEERING-GEAR.

1,233,025.

Specification of Letters Patent.

Patented July 10, 1917.

Application filed August 4, 1916. Serial No. 113,153.

*To all whom it may concern:*

Be it known that I, GEORGE H. CHAPLAIN, a citizen of the United States, residing at Leavenworth, in the county of Leavenworth and State of Kansas, have invented certain new and useful Improvements in Steering-Gears, of which the following is a specification.

My invention relates to new and useful improvements in steering gears for use upon motor vehicles, aeroplanes, boats and the like, but slight modifications in structure being required to adapt it for use with any of these machines. The primary object of my invention consists in the provision of a safety attachment for steering gears of the type now in use so that in case of breakage of the usual steering gear, the vehicle will still be under the control of the operator.

More specifically, one of the objects of my invention consists in providing a steering gear in which the various levers, drag links, connecting rods and the like are in duplicate, one set operating under normal conditions and being actuated by a steering wheel or other usual means, and the other set being adapted for operation in case of injury to the first set.

A still further object of my present invention consists in rendering the transmission, from one set of steering mechanism to the other, automatic upon the breaking of the primary set of mechanism.

With these and other objects in view, my invention will be more fully described, illustrated in the accompanying drawings, and then specifically pointed out in the claims which are attached to and form a part of this application.

In the drawings:

Figure 1 is a side elevation of my invention applied to a conventional form of motor vehicle, parts of the vehicle being broken away to more clearly show the construction and arrangement of the steering gear;

Fig. 2 is a perspective view of the steering gear proper, showing its duplicate construction;

Fig. 3 is a fragmentary view, showing the automatic clutch for throwing the secondary steering mechanism into operation upon injury to the primary steering mechanism.

Corresponding and like parts are referred to in the following description and indicated in all the views of the drawings by the same reference characters.

For the sake of clearness, I have illustrated my invention as applied to a conventional form of motor vehicle 10 having the frame 11 and the usual steering post 12 which carries a fixed worm gear 13. The housing 14 is bolted or otherwise secured to the frame 11 and journals the lower end of the steering post or column 12 and also serves to inclose the worm gear. Journaled in this housing, is a shaft 15 upon which is loosely mounted the hub 16 of a quadrant 17, the peripheral face of which is cut to provide a worm rack 18 which meshes with the worm gear 13. One end of the hub 16 is reduced and squared, as shown at 19, to receive a crank arm 20 which is held against displacement by a pin 21 passed through the shaft and which also serves as a means for holding the hub 16 against longitudinal movement along the shaft in one direction. The opposite end of the hub is provided with square faced clutch teeth 22 for engagement with corresponding clutch teeth 23 of a clutch sleeve 24 which is secured upon the shaft 15 by a key 25 or other suitable means which will permit movement of the sleeve longitudinally of the shaft into and out of engagement with the clutch teeth of the hub 16, but which will hold the sleeve against turning movement upon the shaft. A helical spring 26 surrounds the shaft, engaging at one end against the clutch sleeve and at its other end against the pin 27 passed through the shaft. This spring constantly holds the clutch sleeve in engagement with the hub of the quadrant and, consequently, holds the quadrant against longitudinal movement toward the other end of the shaft. This other end of the shaft is squared, as shown at 28, to receive a crank arm 29 corresponding to the crank arm 20 and of equal length, each of these crank arms, at its free end, terminating in a spherical or ball shaped head 30.

The motor vehicle is provided with the usual steering knuckles 31 which carry the front wheels 32 of the vehicle, each of these steering knuckles, adjacent its upper and lower ends, being provided with rearwardly or forwardly directed arms 33 which in any event extend in the same direction and are of equal length. A drag link 34 connects the upper arm of each steering knuckle and a corresponding drag link 35 connects the lower arms of the knuckles so that turning movement imparted to either knuckle will be transmitted correspondingly to the other as long as one or the other of the drag links remains intact. One of the steering knuckles is provided with upper and lower arms 36 which extend inwardly and are of equal length and steering rods 37 and 38 connect the crank arm 20 and upper arm 36 and the crank arm 29 and lower arm 36, respectively, as clearly shown in Fig. 2. These steering rods, at their rear ends, are formed with two part sockets 39 adapted to be connected by bolts 40 about the spherical heads 30 of the crank arms to provide universal joint connection between the crank arms and rods.

It should be noted at this point that when the crank arms 20 and 29 are parallel with each other, the teeth of the hub 16 are directly in alinement with the teeth of the clutch sleeve 24 so that the quadrant 17 is not locked to the shaft 15. This is the normal condition of the parts and, under this condition, all movement imparted to the quadrant by the turning of the steering post or column 12 is imparted solely to the crank arm 20 and through this arm by way of the steering rod 37 to the steering knuckles to turn them and their wheels 32. Obviously, this turning of the knuckles will be transmitted through the steering rod 38 and crank arm 29 to cause a corresponding turning of the shaft 15 so that the teeth of the quadrant and of the clutch sleeve will still remain in alinement with each other. Under these conditions, the crank arm 29 and steering rod 38 are idle elements. If, however, either the arm 36, to which the steering rod 37, is connected, the steering rod 37, or the crank arm 20 should become broken, it will be clear that any deviation of the forward wheels of the vehicle from the direction in which they were set before the breaking would cause such a turning of the shaft 15 as would bring the clutch sleeve 24 into engagement with the quadrant. Also, under such circumstances, any turning of the steering column 12 will so turn the quadrant with respect to the stationary shaft as to bring the clutch sleeve into engagement with it. It will, therefore, be clear that before the vehicle could turn in any direction or as soon as the driver of the vehicle could turn the steering wheel, the quadrant would be automatically locked to the shaft 15 so that the vehicle could be steered through the crank arm 29 and steering rod 38. By providing each steering knuckle with a pair of arms 33 and connecting the arms of each pair by a separate drag link, any loss of control of the steering gear, due to breaking of one of these arms or one of these links is avoided.

Having thus described the invention, what is claimed as new is:

1. A steering gear including operatively connected steering knuckles, arms extending laterally from the knuckles, a shaft mounted for turning movement, a crank arm extending from the shaft, a steering rod connecting one of the lateral arms of the knuckle with the crank arm, a quadrant mounted loosely upon the shaft and having clutch teeth, a crank arm carried by the quadrant, a steering rod having operative connection between this crank arm and the other lateral arm of the knuckle, a clutch sleeve free for longitudinal movement upon the shaft, but held against rotation thereon, a spring normally tending to hold the clutch sleeve in engagement with the clutch teeth of the quadrant, a steering column, and coöperating means between the steering column and quadrant.

2. A steering gear including doubly linked steering knuckles, one of which is provided with a pair of lateral arms, steering rods connected to the arms, a shaft free for rotation, a quadrant loosely mounted on the shaft, a crank arm fixed to the quadrant and operatively connected to one of the rods, a crank arm fixed to the shaft and operatively connected to the other rod, and means for operatively connecting the quadrant and shaft upon injury to the connection between the quadrant and the steering knuckle.

3. In a steering gear, double linked steering knuckles, one of which is provided with a pair of lateral arms, steering rods connected to the arms, a shaft mounted for turning movement, a quadrant loosely mounted on the shaft, a crank arm fixed to the quadrant and operatively connected to one of the rods, a crank arm fixed to the shaft and operatively connected to the other rod, and a clutch element mounted upon the shaft to turn therewith and adapted to lockingly engage the quadrant upon failure of the shaft and quadrant to turn in unison.

4. In a steering gear, doubly linked steering knuckles, one of which is provided with a pair of lateral arms, a loosely mounted shaft, a quadrant mounted for turning movement upon the shaft, permanent connection between the quadrant and one of the arms, a permanent connection between the shaft and the other of the arms, and means for operatively locking the shaft to the quadrant upon failure of the two to move in unison.

In testimony whereof I affix my signature.

GEORGE H. CHAPLAIN. [L. S.]

Copies of this patent may be obtained for five cents each, by addressing the "Commissioner of Patents, Washington, D. C."